United States Patent [19]

Forsyth

[11] Patent Number: 5,718,556
[45] Date of Patent: Feb. 17, 1998

[54] GRANULAR MATERIAL TRANSPORT APPARATUS

[76] Inventor: Daniel L. Forsyth, 630 Seventh St., SE., Oelwein, Iowa 50662

[21] Appl. No.: 668,523

[22] Filed: Jun. 28, 1996

Related U.S. Application Data

[63] Continuation-in-part of Ser. No. 427,807, Apr. 26, 1995, abandoned.

[51] Int. Cl.[6] .................................................... B60P 1/36
[52] U.S. Cl. ...................... 414/503; 414/505; 414/523; 414/528; 198/317; 198/318
[58] Field of Search ............................. 414/303, 325–327, 414/397–398, 488–489, 503–505, 523, 526, 527, 528; 212/231, 300; 198/312, 315, 316.1, 317, 318, 690.2, 861.4

[56] References Cited

U.S. PATENT DOCUMENTS

| | | | |
|---|---|---|---|
| 606,165 | 6/1898 | Gregory et al. | 198/317 X |
| 2,393,732 | 1/1946 | Balbi | 414/488 |
| 2,730,256 | 1/1956 | Louden et al. | 414/523 X |
| 2,792,952 | 5/1957 | Elder | 414/523 |
| 2,834,451 | 5/1958 | Turner | 414/523 X |
| 2,991,895 | 7/1961 | Dietzenbach | 198/317 X |
| 3,021,025 | 2/1962 | Sudenga et al. | 414/526 X |
| 3,179,272 | 4/1965 | Goldberger | 414/526 X |
| 3,347,350 | 10/1967 | Lindstrom et al. | 198/861.4 |
| 3,465,970 | 9/1969 | Crimm | 414/523 X |
| 3,498,483 | 3/1970 | Meharry | 414/523 |
| 3,987,890 | 10/1976 | Merritt | 198/317 X |
| 4,058,198 | 11/1977 | O'Neill et al. | 198/313 |
| 4,119,223 | 10/1978 | Fiechtor | 414/526 X |
| 4,183,158 | 1/1980 | Satterwhite | 198/318 X |
| 4,781,513 | 11/1988 | ajögren et al. | 414/489 |
| 5,259,717 | 11/1993 | May | 414/528 X |
| 5,443,351 | 8/1995 | Pettijohn | 414/528 X |
| 5,498,119 | 3/1996 | Faivre | 198/317 X |

Primary Examiner—James W. Keenan
Attorney, Agent, or Firm—Allan L. Harms

[57] ABSTRACT

A bulk granular material transport system having multiple compartments with a detachable elevating conveyor to permit the conveyor to assist with unloading as well as loading of the transport device. Each compartment may be individually discharged onto a horizontal conveyor which delivers the seed to the elevating conveyor when the elevating conveyor is in its first position. The elevating conveyor is suspended from an adjustable crane which is pivotable on the frame of the transport system. The elevating conveyor may be released from its first position such that the discharge of the elevating conveyor may be positioned over a compartment of the transport device. All mechanisms are individually actuable through a remote control device.

14 Claims, 7 Drawing Sheets

5,718,556

GRANULAR MATERIAL TRANSPORT APPARATUS

This is a continuation-in-part of application Ser. No. 08/427,807, filed Apr. 26, 1995 now abandoned.

BACKGROUND OF THE INVENTION

In the agricultural industry, large grain producers have begun to accept delivery of seed grain, particularly corn and soybeans, in one ton and larger bags or in large boxes, such as the Q-BIT™ container supplied by the Northrup King Co. of Minneapolis, Minn. This delivery method is a departure from the packaging of seed grain in fifty pound bags which had been prior practice. As a result of the use of large bags or boxes for delivery of soybean seed, seed corn, or other seed grain, new difficulties in moving the seed from the bag or box to the planter have been encountered. The prior method of manually carrying a fifty pound bag to the planter and pouring it into the planter's seed box is no longer feasible. Because a grain planter must be refilled periodically and it is impractical to return the planter to the seed storage location for each refill, the seed must be transported to the field in which planting is underway.

A grain planter may be over thirty feet wide and provided with linearly arranged seed boxes. It is desirable to fill as many of the seed boxes as possible with the fewest movements of the filling mechanism.

An example of an attempt to solve the transport problem is the use of a wheeled cart on which the seed bag can be placed and transported to the planter where some elevator device such as a screw auger must be used to raise the seed from the bag to a height sufficient to fill the planter's grain boxes.

Another attempt to solve the transport problem for the one ton and larger seed bags is the use of a grain wagon having a sloped bottom and having a screw auger located within the bin and fixed to the interior sloping sidewall of the bin. The auger is fed at the lowest point of the bin and discharges the seed over a limited range to fill linearly adjacent grain boxes. The wagon is moved as needed to fill the seed boxes of the planter.

Another existing method provides a grain wagon with an attached auger which is pivotable over a limited range. Again the grain wagon must be relocated when the auger discharge will no longer reach.

With these known methods of handling seed, in order to fill a wide planter, either the planter must be moved, the wagon with auger must be moved, or the freestanding elevator and supply must be relocated.

With the use of a transport wagon, the large container must be raised overhead to fill the bin of the wagon, or else en elevator must be acquired to carry the seed to a height so that the bin can be filled. The elevation of the container over the bin to be filled creates the potential for danger to the operator. The use of a screw auger or other available farm elevator increases the damage to the seed grain.

Some of the existing seed transport apparatus has been adapted from livestock feed transport machines, or from other apparatus for transport of bulk agricultural solids such as granular fertilizer. Existing apparatus in these areas provides inadequate solutions to the problem of satisfactory transport devices which are provided with unloading apparatus and with apparatus for the filling of the transport mechanism.

These shortcomings are overcome by the invention transport device disclosed herein.

SUMMARY OF THE INVENTION

A trailer-mounted, improved bulk agricultural commodity transport system is disclosed which includes a multiplicity of material carrying compartments secured to a common frame which rests on the trailer. Each compartment is provided with a sloped lower region terminating in an individually-controlled, hydraulically-operated gate which may be opened to a varying extent through remote control means. A first belt conveyor is disposed below the gates of the compartments such that material such as seed discharging from a compartment may be conveyed to a transverse chute. The transverse chute is equipped with an intake region disposed beneath the discharge end of the first conveyor. The transverse chute is further provided with a discharge end under which the intake hopper of a moveable elevating conveyor may be located. The first conveyor and the elevating conveyor are each individually operable by hydraulic means which is selectively controlled by remote means.

The elevating conveyor is suspended by a crane member which comprises an elongate articulated arm pivotally mounted at its first end to a vertical support member associated with the frame of the device. The opposing free end of the arm of the crane member is provided with a chain or wire rope interconnected to the elevating conveyor at the approximate midpoint of the elevating conveyor to thereby provide suspending means for the elevating conveyor. The articulated arm comprises a proximal segment pivotally mounted to a distal segment, the segments being further interconnected by a hydraulic piston which is individually operable to selectively control the angular relationship between the proximal segment and the distal segment of the articulated arm. The crane member is thus operable to lift the elevating conveyor from its rest upon the frame of the transport device and to allow for manual location of the elevating conveyor. The elevating conveyor is positionable such that granular material such as seed grain being discharged from one or more of the compartments may be transported along the first conveyor and into the transverse chute and finally along the elevating conveyor to be distributed to receiving containers, such as in the case of seed grain, grain boxes of a grain planter of substantial width. Because the elevating conveyor is suspended on the pivotable crane, its discharge may be moved without moving the transport device. In addition, the elevating conveyor may be positioned through manual lateral movement of the intake end and selective operation of the crane member to position the conveyor to place its discharge end over any one of the compartments of the device with the intake hopper disposed away from the frame of the transport device and near ground level to allow it to receive materials such as seed grain from a supply container or bag raised minimally above the ground or floor surface on which the transport device is resting.

A locking mechanism is provided to selectively retain the intake end of the elevating conveyor to the frame of the transport device such that the intake hopper of the elevating conveyor may be rotably positioned under the discharge end of the transverse chute while yet being retained to the frame of the transport device. The belts of the first conveyor and the elevating conveyor are each provided with resilient paddles depending therefrom, and each belt is selectively individually driven by hydraulic motors.

Each of the conveyors is positioned in a close fitting case. The belt of the elevating conveyor is driven in a direction to permit the grain to be moved along the lower internal surface of the case of the elevating conveyor, rather than upon the belt of the elevating conveyor, it being found that damage to seed grain from cracking and fracture is minimized by such operation of the elevating conveyor. When the transport device is used to transport fertilizer or feed, the elevating conveyor may be driven in the conventional manner because breakage of the granules may be of little concern.

A self-contained power plant is provided to provide pressurized hydraulic fluid to selectively operate the arm of the crane member, the gates of the compartments and the hydraulic motors on each of the belt conveyors. The power plant includes a hydraulic fluid reservoir and a gasoline fueled internal combustion engine which drives a hydraulic pump. The engine also drives a generator which generates electricity for the control signals of the selectively operable members of the device. Electromechanical control valves are associated with the remote control means and the hydraulic control valves to permit selective operation of the conveyors, crane arm, and discharge gates.

It is therefore an object of the invention to provide an improved agricultural granular material transport device which may be employed to fill itself as well as to discharge itself.

It is a further object of the invention to provide a seed grain transport device which permits a multiplicity of different plant variety seeds to be transported at the same time.

It is a further object of the invention to provide a seed grain transport device which can be utilized to fill a thirty-foot wide grain planter without having to relocate the transport device or the planter.

It is a further object of the invention to provide a seed grain transport device which does not require the overhead lifting of one ton and larger seed containers to fill the device.

It is a further object of the invention to provide a seed grain transport device which discharges grain to a grain planter with minimal cracking or fracture of the seed grain.

It is a further object of the invention to provide a method of elevating seed grain with minimal mechanical damage to the seed grain.

It is a further object of the invention to provide a granular material transport device which permits transport of differing materials at the same time with selective discharge of one or more of the types of material.

These and other objects will be understood from the detailed description which follows.

DESCRIPTION OF THE DRAWING FIGURES

DETAILED DESCRIPTION OF THE INVENTION

Figure 1:
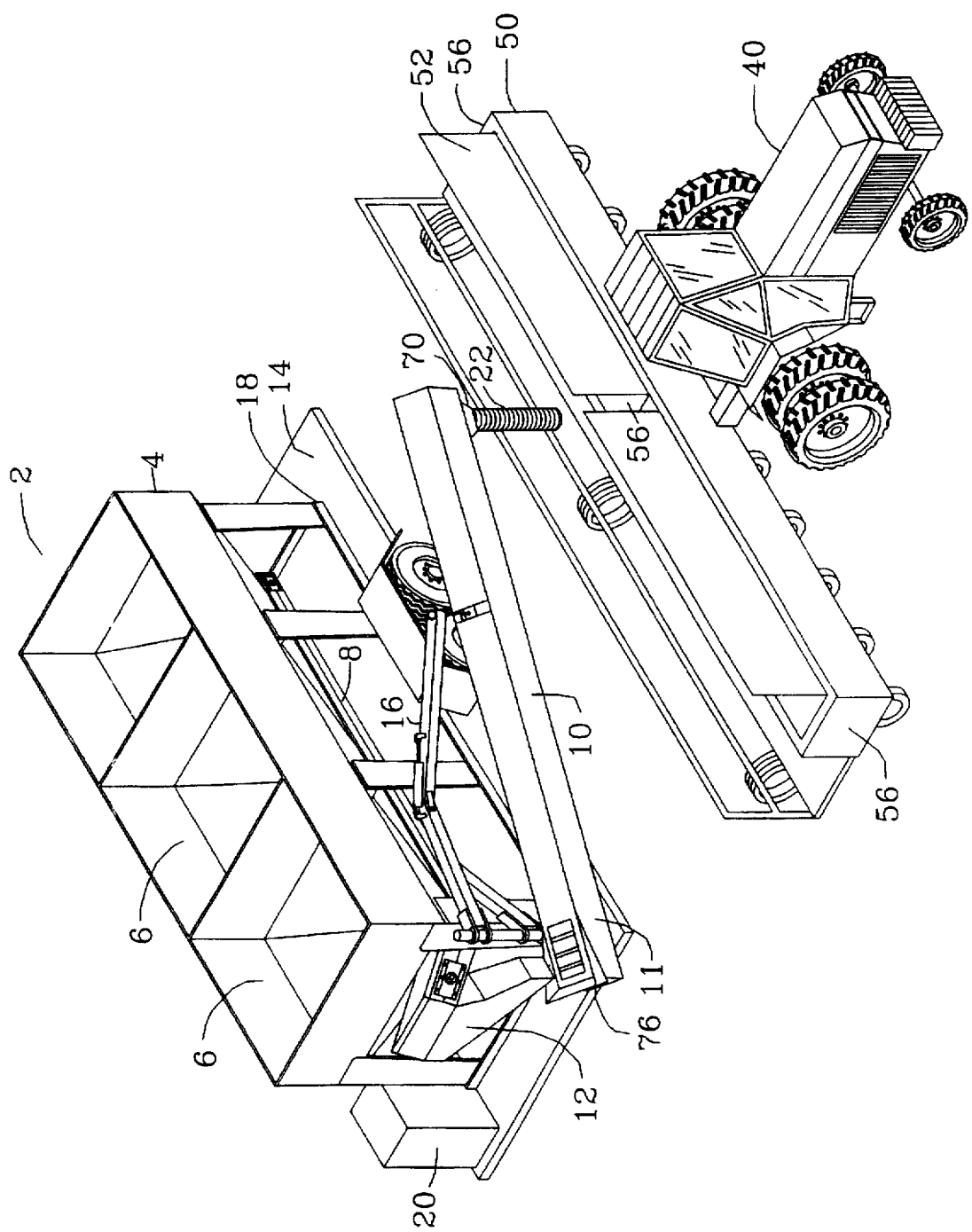
FIG. 1 is a perspective view of the invention being employed to fill the seed boxes of a wide seed planter connected to a farm tractor, with the elevating conveyor of the invention being deployed in an off loading position.

FIG. 1 illustrates the use of the invention 2 in use for transport of seed grain and to fill a planter 50 attached to a farm tractor 40. The seed planter 50 is provided with multiple seed boxes 56. Cover 52 of one seed box 56 is in its open position such that seed may be deposited in opening 54 of seed box 56 through flexible chute 22 which is attached to the discharge spout 70 of elevating conveyor 10. Elevating conveyor 10 is in an off loading position with its intake end 11 locked to frame 18 of compartment assembly 4 of the invention 2. Crane 16 is suitably pivoted relative to compartment assembly 4 such that it suspends elevating conveyor 10 over seed boxes 56. When seed is required for filling a seed box 56, power plant 20 is activated to provide pressurized hydraulic fluid to hydraulic control valves and to hydraulic motors which open one of compartments 6 and drive first conveyor 8 which delivers seed to chute 12 which directs it into intake hopper 76 of intake end 11 of elevating conveyor 10.

Invention 2 has been mounted to suitable trailer 14 such that invention 2 may be transported from seed storage facility to field and back.

It is to be understood that invention 2 may be provided with a tarpaulin or other removable cover of well known type to protect the contents of compartments 6 from the elements.

Figure 2:
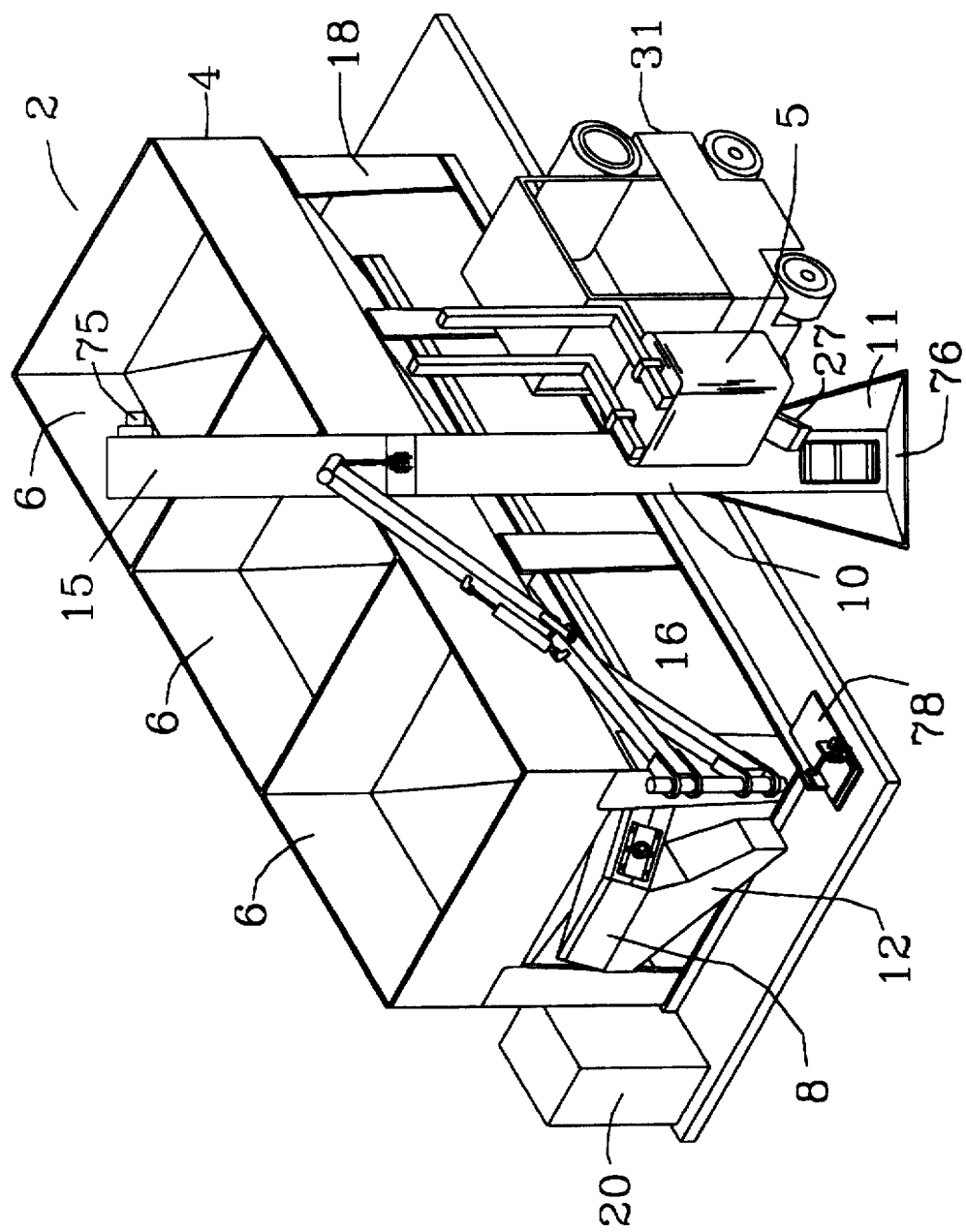
FIG. 2 is a perspective view of the invention being filled from a large seed bag being hoisted by a fork lift, with the elevating conveyor of the invention being deployed to raise seed grain from approximate ground level to a position above one of the compartments of the invention.

FIG. 2 discloses invention 2 set up for filling the compartments 6 thereof. In the preferred embodiment, multiple compartments 6 for receiving granular materials such as feed, seed, or fertilizer, are linearly arranged in compartment assembly 4, which is supported on frame 18. Intake end 11 of elevating conveyor 10 has been released from its detachable mounting to turntable 78 on frame 18.

Elevating conveyor 10 has been manipulated to place its discharge spout 70 above a selected compartment 6 with the intake end 11 of elevating conveyor 10 resting on the ground surface. The use of crane 16 permits manual location of elevating conveyor 10 because crane 16 suspends elevating conveyor 10 near the midpoint thereof.

A forklift 31 is shown lifting seed bag 5 sufficiently to allow the discharge of seed from bag 5 through the drain tube 27 of bag 5 into intake hopper 76 of elevating conveyor 10. Power plant 20 is actuated to provide hydraulic fluid under pressure to drive the hydraulic motor 75 to actuate elevating conveyor 10 and thus to carry seed from intake hopper 76 along elevating conveyor 10 for discharge into compartment 6. First conveyor 8 is not actuated when invention 2 is used in the loading procedure illustrated in FIG. 2.

Referring now to FIGS. 3–6, details of the components of the invention may be visualized. The system invention 2 is mounted to a suitably sized trailer 14 by detachable means such that the invention 2 may be removed from trailer 14 when it is desired to use trailer 14 for other transportation needs. It is to be understood that invention 2 may be permanently mounted to running gear if desired, without departing from the usefulness of the invention. In the preferred embodiment, the trailer 14 is of the "goose neck" style such that it may be towed by a pickup truck fixed with appropriate coupling means of well known type.

Invention 2 comprises compartment assembly 4 supported on frame 18. Compartment assembly 4 includes a multiplicity of separate compartments 6 which are provided to be filled with granular materials such as grain, fertilizer or feed. It should be understood that different varieties of the same grain are sometimes desired in sections of a field to be planted, and therefore, a different variety of seed may be transported in each one of compartments 6 when invention 2 is used to transport seed grain. The use of multiple compartments allows multiple varieties to be transported on the same trip of the invention system.

Disposed upon each of compartments 6 are sloped regions 26 which terminate in ports selectively closed by gates 24. Gates 24 are operated by hydraulic cylinders 25 mounted thereto. Hydraulic cylinders 25 are selectively activated by use of conventional electromechanical hydraulic control valves (not shown). A remote control 17 and associated wiring of well known design (not shown) are employed to activate selected hydraulic cylinder 25.

Disposed below gates 24 is a first conveyor 8 which has a first generally horizontal region 9 linearly attached to an inclined region 7. Horizontal region 9 of first conveyor 8 is provided with intake openings under each of gates 24 such that granular material exiting one of containers 6 through a port 29 is dropped onto conveyor 8 which may then transport the material to discharge end 5 of first conveyor 8. In the preferred embodiment, first conveyor 8 comprises a belt conveyor having resilient paddles depending from the belt, the belt being generally enclosed in an elongate case 3 having openings therealong in registry with the ports of compartment 6 which are closed by gates 24.

Figure 6:
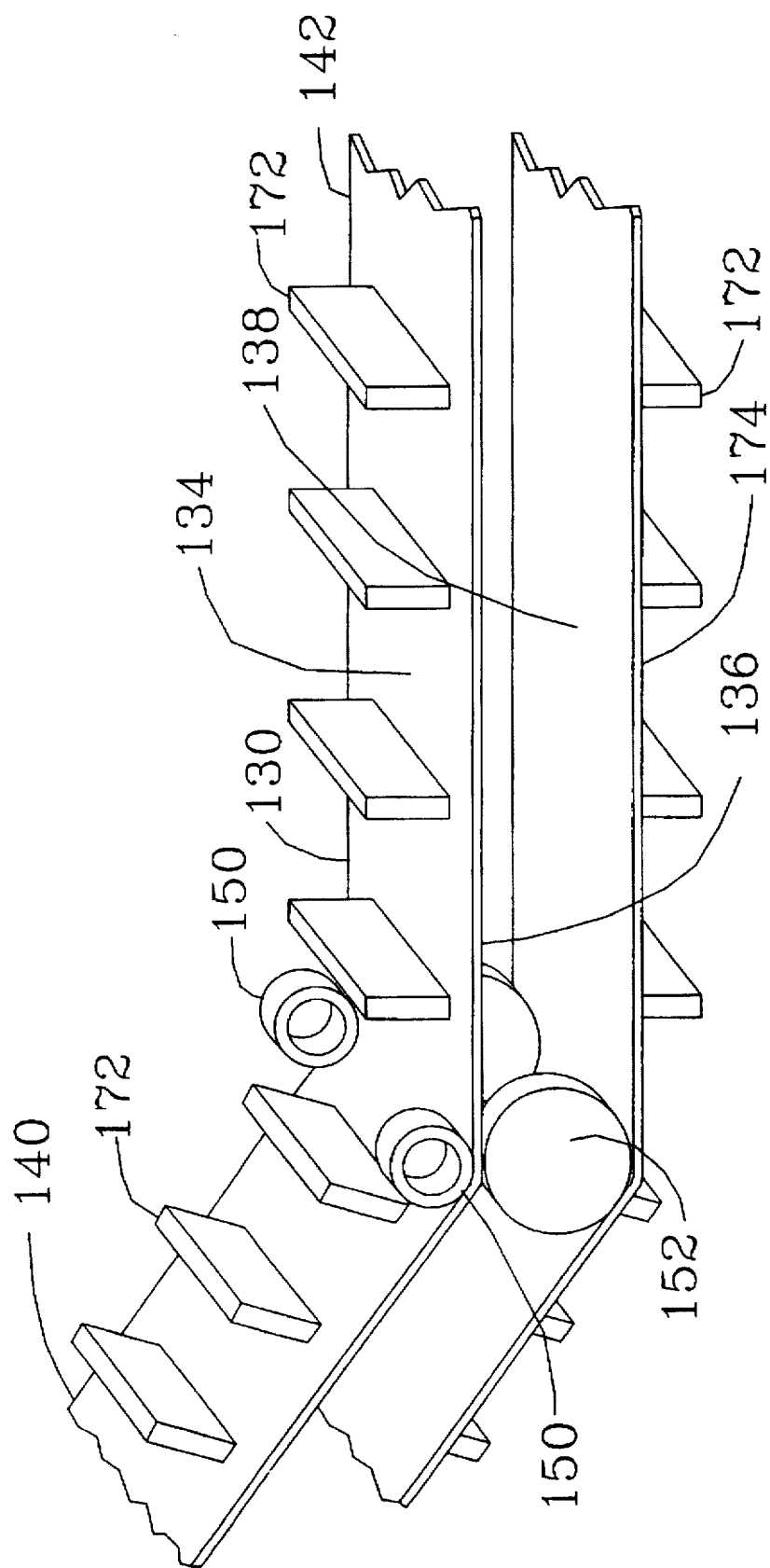
FIG. 6 is a front right perspective of the first conveyor of the invention with its case removed, illustrating the mechanism utilized to change incline of the conveyor belt.

FIG. 6 illustrates first conveyor 8 with the case 3 therefore removed to allow disclosure of the path of endless belt 130 of first conveyor 8. Belt 130 is provided with resilient paddles 172 which depend generally perpendicularly from belt 130. Paddles 172 are sized to provide a small clearance between belt edges 132 and paddles 172. In the preferred embodiment, belt 130 is ten inches wide while paddles 172 are eight inches wide and are placed symmetrically transversely on belt 130 such that a one inch unobstructed region exists on belt 130 on either side of paddles 172.

Upper rollers 150 engage top surface 134 of belt 130 along the edges thereof while lower rollers 152 engage the edges of lower surface 136 of belt 130. Upper rollers 150 and lower rollers 152 are disposed to frictionally engage belt 130 as it is passed through thereby permitting belt 130 to be redirected along an inclined path while preventing belt 130 from disengaging rollers 150 and 152. Region 140 of belt 130 is inclined in relation to generally horizontal region 142 of belt 130. A skirtboard of conventional construction comprising a flexible inclined wall attached to the inside of the case of the first conveyor 8 and slidably touching top surface 134 is employed to divert material being conveyed toward the center of belt 130 and away from rollers 150.

Lower rollers 152 also touchingly engage the edges of upper surface 138 of returning lower segment 174 of belt 130 to direct the path of lower segment 174.

Because belt 130 is driven to move material on the upper surface 134 thereof along the generally horizontal region 142 and along inclined region 140, upper rollers 150 are urged in a clockwise direction by belt 130 while lower rollers 152 are urged in a counterclockwise direction by lower surface 136 of belt 130 and further by lower segment 174 passing over lower rollers 152.

Figure 7:
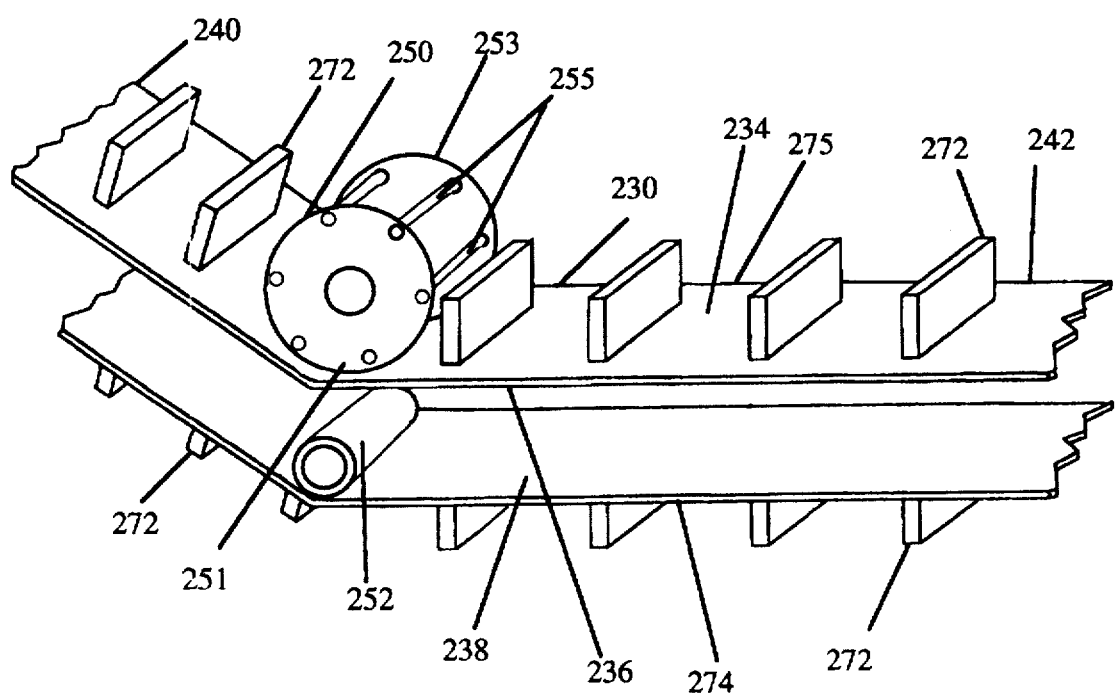
FIG. 7 is a front right perspective showing an alternative form of the first conveyor of the invention with its case removed, disclosing idler rollers which effect change in the incline of the conveyor's belt.

FIG. 7 discloses an alternative direction changing apparatus for first conveyor 8 wherein belt 230 of first conveyor 8 carries flexible paddles 272 which depend generally perpendicularly from belt 230 and are placed transversely thereon. Paddles 272 may be generally the same width as belt 230.

Region 240 of belt 230 is inclined in relation to generally horizontal region 242 of belt 230. Upper idler cylinder 250 engages top surface 234 of belt 230 while lower idler roller 252 engages the upper surface 238 of lower segment 274 of blet 230. Upper idler cylinder 250 touchingly engages belt 230 as it is passed below it, causing upper segment 275 of belt 230 to be redirected along an inclined path while lower idler roller 252 touchingly engages the upper surface 238 of returning lower segment 274 of belt 230 to direct the path of lower segment 274. A skirtboard of conventional construction comprising a flexible inclined wall may be attached to the inside of the case of the first conveyor 8 to divert material being conveyed toward the center of belt 230.

Upper idler cylinder 250 comprises a pair of endwalls 251 and 253 held in parallel spaced apart relationship by myltiplicity of ribs 255. Ribs 255 may be cylindrical and are substantially smaller in diameter than the diameter of cylinder 250. Ribs 255 interconnect the outer peripheries of end walls 251 and 253, it being found that such number of ribs 255 is adequate to urge belt 230 into proper position while causing little grain damage.

Referring again to FIG. 5, discharge end 5 of first conveyor 8 is disposed to allow material being conveyed by first conveyor 8 to be fed into transverse chute 12. Chute 12 comprises an elongate duct suitably inclined such that granular material dropping onto chute 12 will slide therealong to be discharged into intake hopper 76 of elevating conveyor 10 when elevating conveyor 10 is in its off load position.

Figure 3:
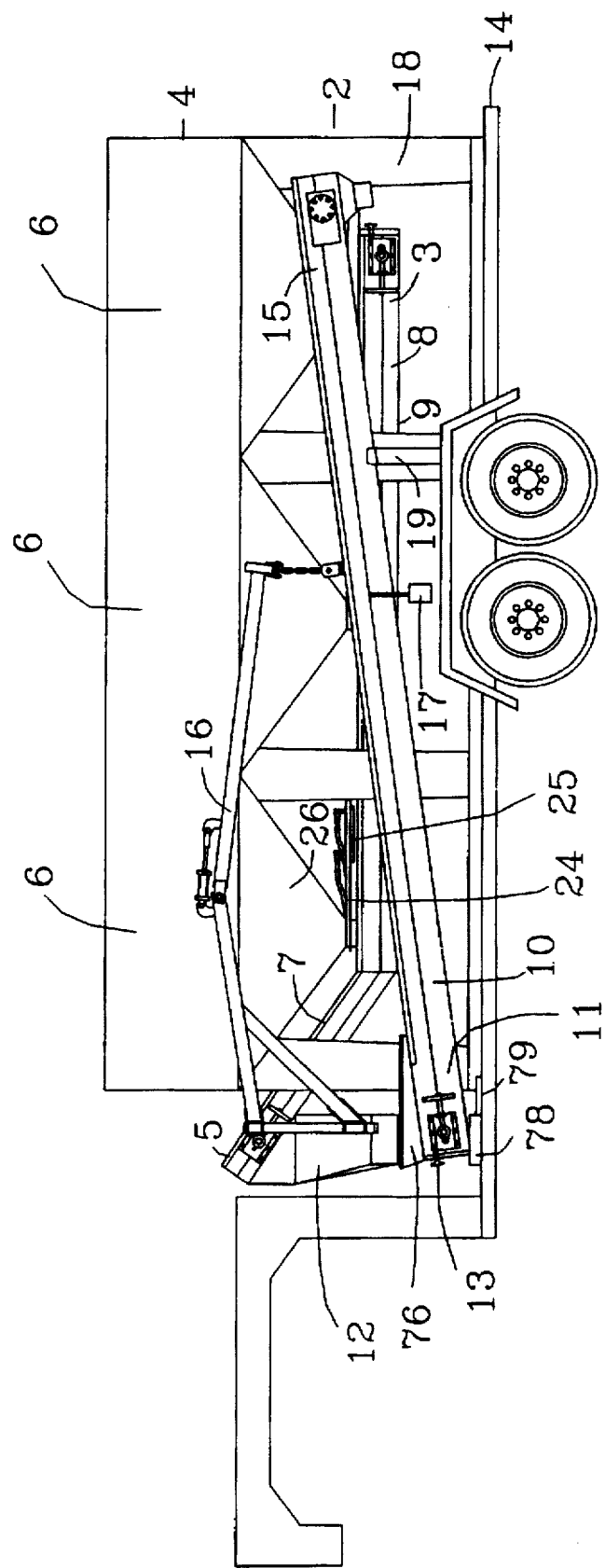
FIG. 3 is a front elevation of the preferred embodiment of the invention with the elevating conveyor at rest with its intake end secured to the frame of the invention.

In FIG. 3, elevating conveyor 10 is shown in its storage position alongside compartment assembly 4 and resting on support 19. Intake end 11 of elevating conveyor 10 is retained to frame 18 by turntable 78. Turntable 78 is horizontally rotatable on plate 79 of frame 18 such that when intake end 11 of elevating conveyor 10 is latched to turntable 78, elevating conveyor 10 may be pivoted about its intake end 11. The placement of turntable 78 relative to frame 18 causes intake hopper 76 of intake end 11 of elevating conveyor 10 to be disposed to receive granular material being discharged from chute 12.

When intake end 11 of elevating conveyor 10 is detached from turntable 78, intake end 11 of elevating conveyor 10 may be moved manually and placed upon the ground or floor surface with discharge end 15 of elevating conveyor 10 positioned above one of compartments 6. Seed directed into intake hopper 76 can then be conveyed from ground level to a compartment 6 without substantial elevation of the bulk seed container. Handle 13 is provided on intake end 11 of elevating conveyor 10 to provide a hold for manipulation of the elevating conveyor 10. Elevating conveyor 10 includes a close fitting case 81 which substantially encloses belt 74. Case 81 includes a lower case wall 82 disposed below belt 74.

Figure 4:
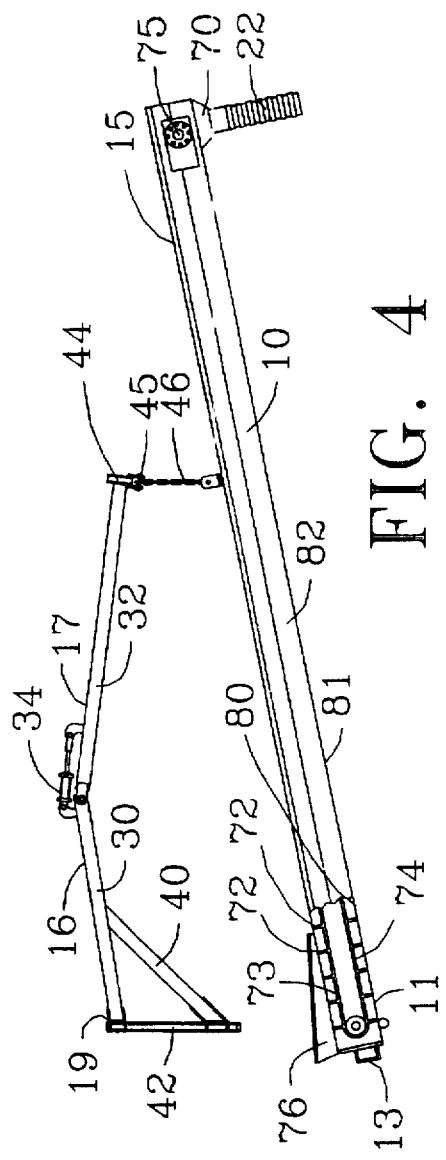
FIG. 4 is a front elevation of the crane member and elevating conveyor of the invention showing the suspension, of the elevating conveyor from the crane member and showing a portion of the case of the elevating conveyor cut away.

FIG. 4 provides a detailed view of elevating conveyor 10 and the crane member 16 associated therewith. Crane member 16 comprises an elongate articulated arm 17 having a first end 19 pivotably mounted to a vertical bar 42 of frame 18 of invention 2. A brace 40 serves to support arm 17 and also is pivotably mounted to vertical bar 42. Arm 17 of crane member 16 comprises a proximal segment 30 joined hingedly to distal segment 32 of the arm 17. Distal segment 32 may be pivoted vertically upon proximal segment 30 and the angle of intersection of proximal segment 30 and distal segment 30 is controlled by selective use of hydraulic cylinder 34 which is remotely controlled.

Articulated arm 17 terminates in head piece 44 from which is suspended a flexible cable 46 by swivel 45. Flexible cable 46 is fixed to elevating conveyor 10 along its length, generally at its midpoint.

Crane member 16 is operable to raise and lower elevating conveyor 10 by its suspension from cable 46. Crane member may be swung away from compartment assembly 4 thereby positioning elevating conveyor 10 where desired.

Reference to FIG. 4 also shows that belt 74 of elevating conveyor 10 is provided with resilient paddles 72 depending from belt 74. Belt 74 is driven by hydraulic motor 75 mounted on discharge end 15 of elevating conveyor 10. Hydraulic motor 75 may be selectively operated in a counterclockwise direction to cause top region 73 of belt 74 to move toward intake end 11. Seed received by intake hopper 76 is urged along inner surface 80 of lower case wall 82 by paddles 72. The operation of belt 74 in this manner has proven to reduce fracture of seed as it passes along conveyor 10. When fertilizer, feed or other granular material is to be conveyed, bolt 74 may optionally be driven in the conventional manner with the material being conveyed along on the top region 73 of belt 74.

Discharge end 15 of elevating conveyor 10 is provided with spout 70 of conventional type which is further provided with flexible chute 22 thereon. Flexible chute 22 may be manipulated to direct granular material being discharged from elevating conveyor 10 into the receiving means.

Figure 5:
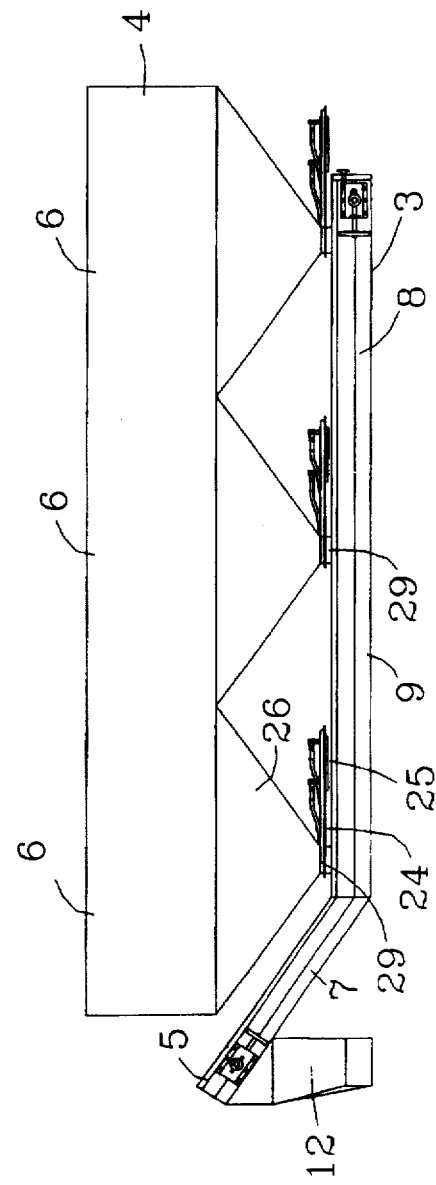
FIG. 5 is a front elevation of the storage compartments and first conveyor of the invention.

FIG. 5 discloses the details of compartment assembly 4 of the invention. Compartment assembly 4 includes three compartments 6 in the preferred embodiment. Each compartment 6 is provided with a sloped region 26 having a port 29 at the lowest point thereof. The port 29 of each compartment 6 is selectively closed or opened by a hydraulically-operated gate 24 which is operated by hydraulic cylinder 25. Each hydraulic cylinder is independently operable by operation of remote control 17 (see FIG. 3).

Figure 8:
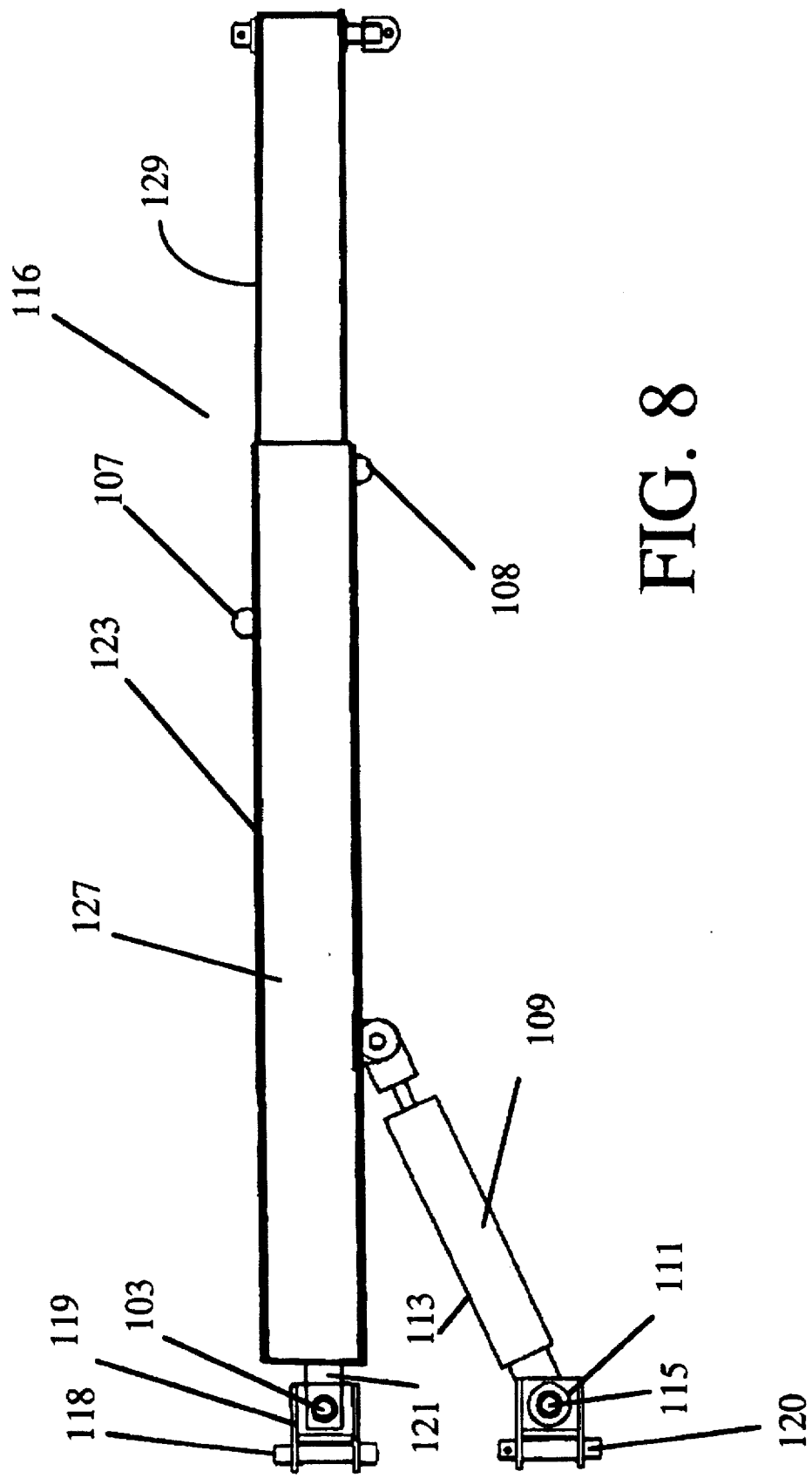
FIG. 8 is a front elevation of an alternate embodiment crane member of the invention having a telescoping distal segment extendible from a proximal segment.

An alternative embodiment of the crane member is illustrated in FIG. 8 wherein crane assembly 116 comprises a first vertical support pin 118 which is retained to frame 18. Together with second vertical support pin 120 which is also retained to frame 18, first vertical support pin 118 allows crane assembly 116 to pivot in a horizontal locus upon frame 18. First pivot bracket 119 pivots about first vertical support pin 118 and pivotally retains mounting bar 121 by axle 103. Mounting bar 121 is fixed to crane arm 123 and is coaxial therewith. Since mounting bar 121 is mounted to first pivot bracket 119 by axle 103, crane arm 123 is selectively pivotal in a vertical range which is limited by the extensibility of hydraulic ram 109 which can be activated to raise and lower crane arm 123. It can be seen that hydraulic ram 109 interconnects second mounting bracket 111 and crane arm 123 and that hydraulic cylinder 113 is vertically pivotable on second mounting bracket 111 about axle pin 115. Second mounting bracket 111 pivots in a horizonal direction about second vertical support pin 120.

Crane arm 123 comprises a first bar 127 which slidingly, axially, receives telescoping member 129. The action of a hydraulic ram effects the extension and retraction of telescoping member 129 from within first bar 127. Roller bearings 107 and 108 are mounted in the upper and lower walls respectively of first bar 127 to bear telescoping member 129. Support head 117 is mounted to telescoping member 129 such that support head 117 is rotatable on a generally vertical axis and is useful to suspend elevating conveyor 10 therefrom.

OPERATION OF THE INVENTION

When the invention is used as a seed transport device, it is installed on a suitable trailer and brought to the storage area where bulk seed is housed. The elevating conveyor is raised by the crane and its intake end is released from its storage position on the frame of the device. The intake end of the elevating conveyor may then be manipulated to a position where the discharge end of the elevating conveyor is positioned over a selected compartment of the device while the intake end of the elevating conveyor is placed at rest on the floor or ground surface. Seed from a large bag or box may then be fed to the intake of the elevating conveyor and the selected compartment filled.

Following fill operations, the elevating conveyor is manipulated to its storage position where the intake end thereof is selectively mounted to the frame of the transport device, the conveyor is rotated and lowered to a rest position alongside the frame of the compartment assembly. The seed containing transport system is then transported to the field and appropriately placed relative to a seed planter.

The crane member is then raised to suspend the elevating conveyor such that its discharge end is disposed above the seed boxes of the planter. The intake end of the conveyor remains fixed in a pivotable manner to the frame of the transport device. The first and elevating conveyors are actuated and the gate to the compartment carrying the seed desired to be planted is opened by remote hydraulic means. Seed is then allowed to discharge onto the first conveyor and be transported to the transverse chute which directs the seed to the intake of the elevating conveyor. The elevating conveyor is driven such that the seed is urged along the inside lower wall of the case by resilient paddles on the conveyor's belt. The seed is then discharged from the elevating conveyor into the planter's seed box. When one seed box is full, the elevating conveyor may be pivoted to a placement above another seed box on the planter. A flexible tube depending from the discharge chute of the elevating conveyor directs the seed from the elevating conveyor into the seed box.

Having described the invention, I claim:

1. Apparatus for receiving, transporting and discharging seed grain to a seed planter comprising a frame having a multiplicity of compartments mounted thereto, each compartment having a discharge opening at the lowermost part thereof, each discharge opening being selectively closed by a hydraulically operated gate, a first elongate conveyor mounted to said frame and disposed below the discharge openings of said compartments, said first conveyor having a discharge end thereon, an elevating conveyor associated with said frame and movable in relation thereto, said elevating conveyor having an intake end and a discharge end, chute means for conveying seed grain from the discharge end of said first conveyor to the intake end of the elevating conveyor, a crane member disposed upon said frame supporting said elevating conveyor, said crane member having a first end thereof pivotally mounted to said frame, said crane member horizontally pivotable upon said frame, said crane member interconnected to said elevating conveyor along its length, said elevating conveyor selectively fixable to said flame at its intake end, said elevating conveyor in a first position thereof pivotally fixed at its intake end to said frame, the intake end of said elevating conveyor disconnected from said frame in a second position of said elevating conveyor, said first conveyor selectively independently operable, said elevating conveyor selectively independently operable, each of said gates of said compartments selectively independently operable, hydraulic power means to operate said conveyors and said gates, said first conveyor is a belt conveyor having resilient paddles depending therefrom, said first conveyor has a substantially horizontal region therealong, said first conveyor has an inclining segment therealong, said inclining segment of said first conveyor is adjacent said discharge end of said first conveyor, said first conveyor comprises an endless belt, said resilient paddles depending generally perpendicular to said endless belt, said first conveyor has rollers engaging said belt at the junction of said horizontal region and said inclining segment of said endless belt, said rollers comprise paired upper rollers and lower rollers, said belt has an upper segment with lateral opposing edges which pass between said pairs of said upper rollers and said lower rollers, said upper rollers displaced from said lower rollers a distance smaller than the thickness of said belt.

2. The apparatus of claim 1 wherein said hydraulically operated gates and said conveyors are operable by remote control means.

3. The apparatus of claim 2 wherein said elevating conveyor comprises an endless belt enclosed by an elongate case, said belt has resilient paddles depending therefrom, said belt has an upper segment and a lower segment, said upper segment of said belt of said elevating conveyor is driven toward the intake end of said elevating conveyor, said paddles of the lower segment of said belt of said elevating conveyor slidably engage the case of said conveyor.

4. The apparatus of claim 3 wherein said crane has a distal segment and a proximal segment, said distal segment depends from said proximal segment and is hingedly attached thereto, a hydraulic cylinder interconnects said proximal segment and said distal segment of said crane, said hydraulic cylinder is selectively operable to change the angular relationship between said distal segment and said proximal segment, said distal segment of said crane has a nonrigid suspension member depending therefrom, said nonrigid suspension member is fixed to said elevating conveyor along the length thereof, said nonrigid suspension member is rotatably fixed to said distal segment of said crane, said crane is pivotally mounted to an upright post of said frame, said crane is horizontally pivotal upon said frame.

5. Apparatus for receiving, transporting and discharging seed grain to a seed planter comprising a frame having at least one compartment mounted thereto, the at least one compartment having a discharge opening at the lowermost part thereof, the discharge opening being selectively closed by a hydraulically operated gate, a first conveyor mounted to said frame and disposed below the discharge opening of said at least one compartment, said first conveyor having a discharge end thereon, an elevating conveyor associated with said frame and movable in relation thereto, said elevating conveyor having an intake end and a discharge end, chute means for conveying seed grain from the discharge end of said first conveyor to the intake end of the elevating conveyor, a crane member disposed upon said frame supporting said elevating conveyor, said crane member having a first end thereof pivotally mounted to said frame, said crane horizontally pivotable upon said frame, said crane member interconnected to said elevating conveyor along its length, said elevating conveyor selectively fixable to said frame at its intake end, said elevating conveyor in a first position thereof pivotally fixed at its intake end to said frame, the intake end of said elevating conveyor disconnected from said frame in a second position of said elevating conveyor, said first conveyor selectively independently operable, said elevating conveyor selectively independently operable, said gate of said compartment selectively independently operable, hydraulic power means to operate said conveyors and said gate, said elevating conveyor comprises an endless belt enclosed by an elongate case, said belt has flexible paddles depending therefrom, said belt has an upper segment and a lower segment, said upper segment of said belt of said elevating conveyor is driven toward the intake end of said elevating conveyor, said paddles of the lower segment of said belt of said elevating conveyor slidably engaging the case of said conveyor.

6. The apparatus of claim 5 wherein said frame has a multiplicity of linearly adjacent compartments mounted thereto, each compartment has a discharge opening at the lowermost part thereof, each discharge opening is selectively closed by a hydraulically operated gate, said first conveyor is disposed below the discharge openings of said compartments, each of said gates of said compartments is selectively independently operable.

7. Grain transport apparatus comprising a frame having at least one compartment mounted thereto, the at least one compartment having a discharge opening at the lowermost part thereof, the discharge opening being selectively closed by a gate, an elevating conveyor associated with said frame and movable in relation thereto, said elevating conveyor having an intake end and a discharge end, means for conveying said grain from the gate of said at least one compartment to the intake end of said elevating conveyor, a crane member disposed upon said frame supporting said elevating conveyor, said crane member interconnected to said elevating conveyor along its length, said crane comprising a vertical support member and an arm member, said support member of said crane pivotally attached to said frame, said arm member fixed to said support member of said crane, said arm member comprising a distal segment and a proximal segment, said distal segment depending from said proximal segment and hingedly attached thereto, said elevating conveyor selectively fixable to said frame at its intake end, said elevating conveyor in a first position thereof pivotally fixed at its intake end to said frame, said intake end of said elevating conveyor disconnected from said frame in a second position of said elevating conveyor, power means to operate said conveyor.

8. The apparatus of claim 7 wherein a hydraulic cylinder interconnects said proximal segment and said distal segment of said crane, said hydraulic cylinder is selectively operable to change the angular relationship between said distal segment and said proximal segment.

9. The apparatus of claim 8 wherein said distal segment of said crane has a nonrigid suspension member depending therefrom, said nonrigid suspension member is fixed to said elevating conveyor along the length thereof, said nonrigid suspension member is rotatably fixed to said distal segment of said crane.

10. The apparatus of claim 7 wherein said intake end of said elevating conveyor is selectively attachable to said frame by a turntable.

11. The apparatus of claim 10 wherein said turntable is rotatable in a generally horizontal plane, said turntable has a locking mechanism to selectively retain said intake end of said elevating conveyor to said turntable.

12. The apparatus of claim 7 wherein said frame has a multiplicity of compartments mounted thereto, each compartment has a discharge opening at the lowermost part thereof, each discharge opening is selectively closed by a gate, a first conveyor is mounted to said frame and disposed below the discharge openings of said compartments, said first conveyor has a discharge end thereon, said first conveyor is disposed below the discharge openings of said compartments, a chute is disposed between the discharge end of said first conveyor and the intake end of said elevating conveyor, said first conveyor is selectively independently operable, said elevating conveyor is selectively independently operable, each of said gate of said compartments is selectively independently operable.

13. Apparatus for receiving, transporting and discharging granular material comprising a frame having at least one compartment mounted thereto, the at least one compartment having a discharge opening at the lowermost part thereof, the discharge opening being selectively closed by a gate, an elevating conveyor associated with said frame and movable in relation thereto, said elevating conveyor having an intake end and a discharge end, a crane member disposed upon said frame supporting said elevating conveyor, said crane member interconnected to said elevating conveyor along the length thereof, said crane comprising a vertical support member and an arm member, said vertical support member of said crane pivotally attached to said frame, said vertical support member pivotal horizontally on said frame, said arm member having a fixed end and a free end, said arm member pivotally attached at its fixed end to said support member of said crane, said arm member pivotal vertically upon said support member, said arm member comprising a distal segment and a proximal segment, said distal segment receivable in said proximal segment, said distal segment telescopingly attached to said proximal segment, said distal segment selectively telescopably extendible from said proximal segment, said elevating conveyor selectively fixable to said frame at its intake end, said elevating conveyor in a first position thereof pivotally fixed at its intake end to said frame and pivotal horizontally thereon, the intake end of said elevating conveyor in said first position disposed to receive granular material from said discharge opening, said intake end of said elevating conveyor disconnected from said frame in a second position of said elevating conveyor, power means to operate said conveyor.

14. Apparatus for receiving, transporting and discharging seed grain to a seed planter comprising a frame having a multiplicity of compartments mounted thereto, each compartment having a discharge opening at the lowermost part thereof, each discharge opening being selectively closed by a gate, a first elongate conveyor mounted to said frame and disposed below the discharge openings of said compartments, said first conveyor having a discharge end thereon, an elevating conveyor associated with said frame and movable in relation thereto, said elevating conveyor having an intake end and a discharge end, chute means for conveying seed grain from the discharge end of said first conveyor to the intake end of the elevating conveyor, a crane member disposed upon said frame supporting said elevating conveyor, said crane member having a first end thereof pivotally mounted to said frame, said crane member horizontally pivotable upon said frame, said crane member interconnected to said elevating conveyor along its length, said elevating conveyor selectively fixable to said frame at its intake end, said elevating conveyor in a first position thereof pivotally fixed at its intake end to said frame, the intake end of said elevating conveyor disconnected from said frame in a second position of said elevating conveyor, power means to operate said conveyors, said first conveyor is a belt conveyor comprising an endless belt having flexible paddles depending generally perpendicularly therefrom, said first conveyor has a substantially horizontal region therealong, said first conveyor has an inclining segment therealong, said inclining segment of said first conveyor is adjacent said discharge end of said first conveyor, said belt having an upper segment, said first conveyor having a rotatable cage engaging the upper segment of said belt at the junction of said horizontal region and said inclining segment of said endless belt, said cage comprises a pair of spaced apart circular end-plates interconnected by a multiplicity of elongate bars, said multiplicity of bars generally defining a cylindrical sidewall.

* * * * *